No. 782,908.                                               Patented February 21, 1905.

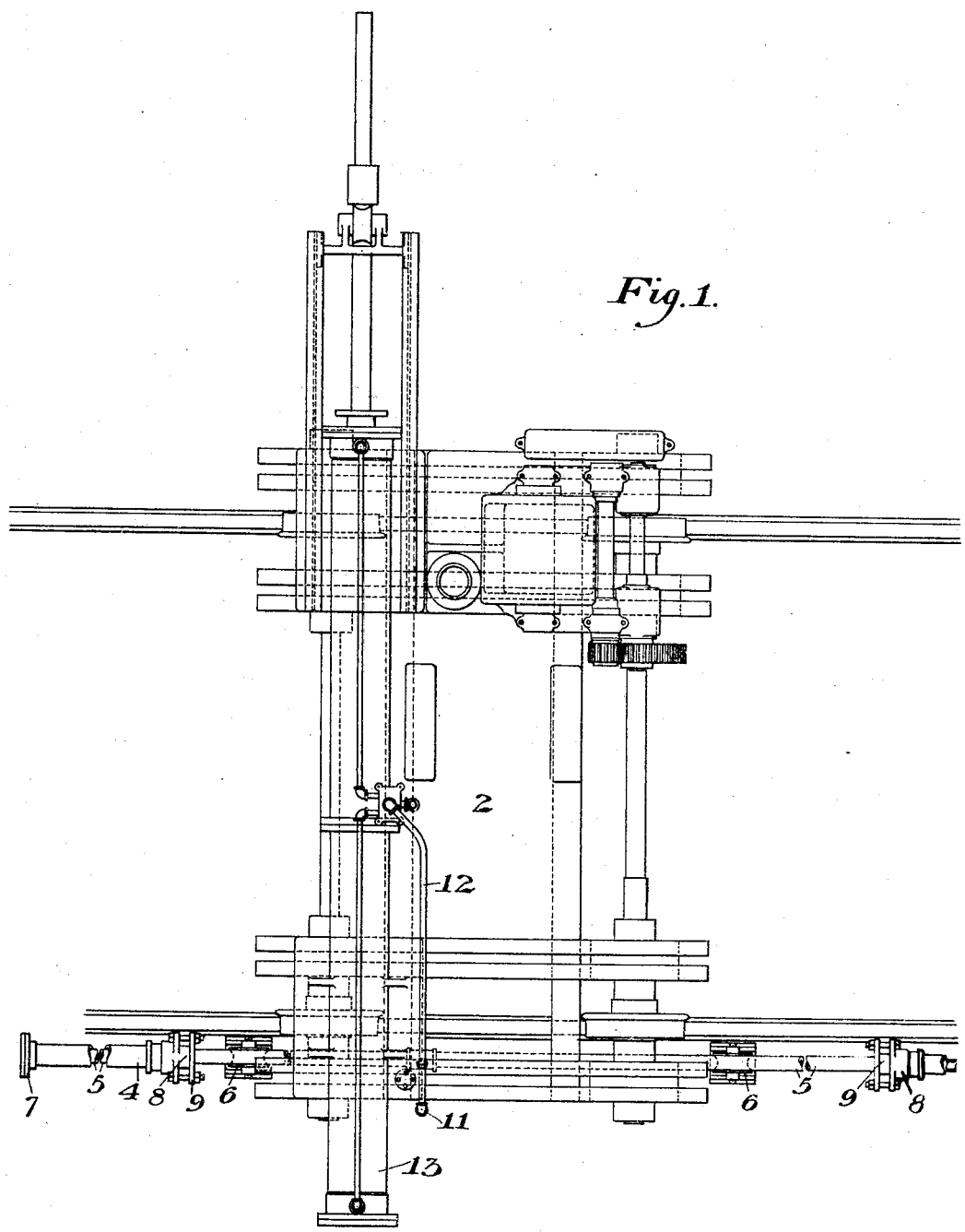

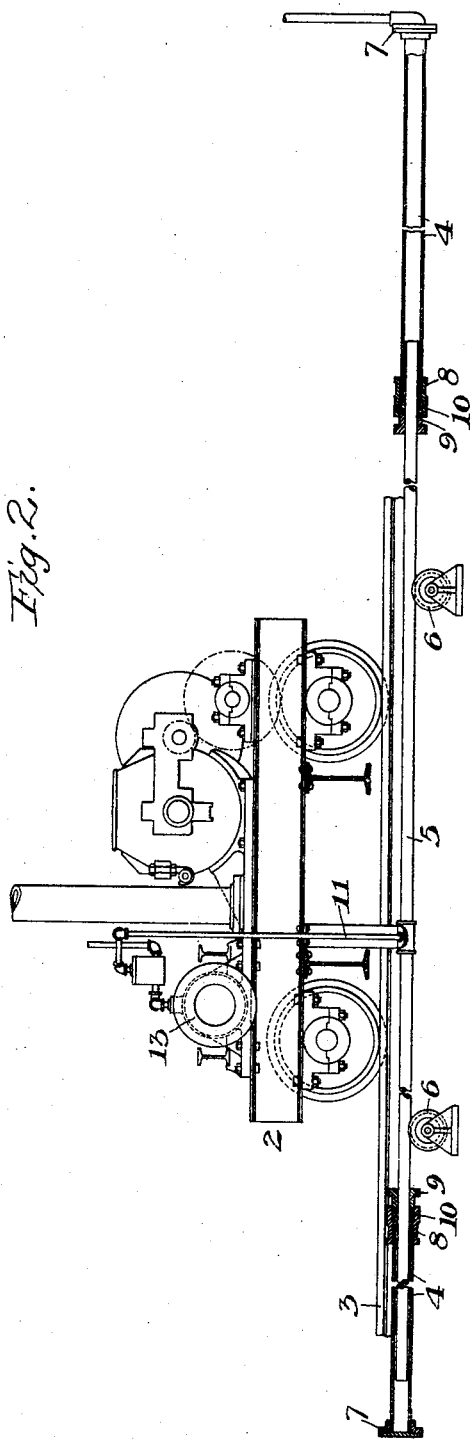

UNITED STATES PATENT OFFICE.

THOMAS JAMES, OF BRADDOCK, PENNSYLVANIA.

CONNECTION FOR FLUID-SUPPLY PIPES.

SPECIFICATION forming part of Letters Patent No. 782,908, dated February 21, 1905.

Application filed April 18, 1904. Serial No. 203,634.

*To all whom it may concern:*

Be it known that I, THOMAS JAMES, of Braddock, Allegheny county, and State of Pennsylvania, have invented a new and useful Improvement in Connections for Fluid-Supply Pipes, of which the following is a full, clear, and exact description, reference being had to the accompanying drawings, forming part of this specification, in which—

Figure 1 is a plan of a traveling charging-machine mounted on a track and equipped with my improved pipe connections for supplying motive fluid to the machine. Fig. 2 is an end elevation of the traveling machine with the improved pipe connection shown in vertical cross-section.

The object of my invention is to provide a system of piping for conducting steam, air, water, or other fluids from a stationary point of supply to a laterally-variable point of use and in providing means for balancing the movable pipe and reducing the power necessary to move it by the traveling machine.

The invention is especially designed for use with apparatus for charging and drawing horizontal heating-furnaces, in which the apparatus is mounted on a track parallel with and in front of a row of such furnaces.

It consists in a movable pipe attached to and moved by the traveling machine and arranged to telescope with stationary pipes, with the ends of the movable pipe projecting into the larger stationary pipes through suitable stuffing-boxes and glands, which make fluid-tight sliding connections between the movable and stationary pipes, and in suitable supports to prevent sagging of the movable pipe and consequent binding in the sliding joints.

Heretofore with this class of apparatus having a fixed point of supply and a laterally-movable point of use of the motive fluid it has been the practice to employ a series of walking-pipes having swivel-joints or to use a flexible-rubber hose. Both of these methods were unsatisfactory and expensive, owing to the frequent delays necessary in making repairs and to the loss by leakage of the motive fluid.

In the drawings, 2 represents a traveling charging-machine mounted on track-rails 3 3. The stationary pipes 4 4, with the movable pipe 5, are located on the outside of the track-rail 3, the movable pipe being supported along its length by suitable idler-wheels 6. On the outer ends of the stationary supply-pipes are suitable heads 7 7, in one of which is a connection leading to the fluid-supply. On the inner ends of the stationary pipes are stuffing-boxes 8 8, having glands 9 9 and packing 10 10, through which the ends of the movable pipe always extend. At about the center of its length the movable pipe is attached to the traveling machine, and through suitable pipes 11 12 the movable pipe is connected with the motive cylinder 13, mounted on the traveling machine.

By the use of my improvement the cost of the apparatus for supplying motive fluid to the charging-machine is greatly reduced. The stuffing-boxes on the ends of the stationary pipes act as guides for the movable pipe. Both ends of the movable pipe being open, the pipe is balanced by the fluid-pressure, and the power required to move the pipe is reduced. The idler-rollers support the movable pipe and prevent bending or sagging and consequent binding in the stuffing-boxes. There being but two sliding connections, both of which are outside packed joints, which are easily and quickly repaired or renewed, the loss from leakage and cost of repairs are greatly reduced and delays caused by making of repairs are avoided.

Variations may be made in the construction of the apparatus without departing from my invention, since

What I claim is—

1. The combination with a traveling machine of a fluid-supply leading thereto, and comprising two stationary pipes in endwise alinement and an intermediate movable pipe extending into the stationary pipes, said movable pipe having a sliding connection with the stationary pipes and being movable with the machine, and a fluid-outlet leading from the traveling pipe to the machine; substantially as described.

2. The combination with two stationary pipes in endwise alinement, of an intermediate movable pipe having telescoping connection with both stationary pipes and receiving fluid from one of them, said movable pipe having an outlet, and a traveling machine moving with the movable pipe and having fluid-supply connection therewith; substantially as described.

In testimony whereof I have hereunto set my hand April 15, 1904.

THOMAS JAMES.

Witnesses:
THOMAS W. BAKEWELL,
RICHARD D. LITTLE.